United States Patent [19]

Olesky et al.

[11] Patent Number: 5,561,244
[45] Date of Patent: Oct. 1, 1996

[54] METHOD AND APPARATUS FOR MEASURING THE DYNAMIC CAMBER OF VEHICLE TIRES

[75] Inventors: Stanley J. Olesky, Akron, Ohio; Paul B. Wilson, Murfreesboro, Tenn.

[73] Assignee: Bridgestone/Firestone, Inc., Akron, Ohio

[21] Appl. No.: 402,247

[22] Filed: Mar. 10, 1995

[51] Int. Cl.$^6$ .......................... G01M 17/02; E01C 23/00
[52] U.S. Cl. .......................... 73/146; 33/203.18; 33/336; 356/139.09
[58] Field of Search .................. 73/146; 33/203, 33/203.12, 203.18, 227, 228, 288, 335, 336, 337; 356/139.09, 152, 155

[56] References Cited

U.S. PATENT DOCUMENTS

| | | | |
|---|---|---|---|
| 2,077,082 | 4/1937 | Wedlake | 33/203 |
| 3,927,561 | 12/1975 | Schleimann | 73/146 |
| 3,963,352 | 6/1976 | Rishovd et al. | 356/152 |
| 4,238,954 | 8/1982 | Langer | 73/146 |
| 4,454,659 | 6/1984 | Eck | 33/288 |
| 4,578,870 | 4/1986 | Cooke | 33/288 |
| 4,770,532 | 9/1988 | Ito | 356/372 |
| 4,856,324 | 8/1989 | Potts | 73/146 |
| 4,896,964 | 1/1990 | Kitazume | 356/376 |
| 4,898,464 | 2/1990 | Thorne et al. | 356/152 |
| 5,268,731 | 12/1993 | Fuchiwaki et al. | 356/5 |
| 5,311,668 | 5/1994 | Longa et al. | 33/203.18 |
| 5,323,647 | 6/1994 | Blanco | 73/146 |

*Primary Examiner*—Richard Chilcot
*Assistant Examiner*—Paul D. Amrozowicz
*Attorney, Agent, or Firm*—Carmen S. Santa Maria

[57] ABSTRACT

An apparatus and method uses a pair of transducers, such as lasers, mounted on the tire/wheel assembly of a mowing vehicle for measuring the actual angles of camber experienced by the vehicle tire as the vehicle moves along an actual road surface. The pair of lasers are mounted in a predetermined horizontal spaced relationship on a bracket mounted on and extending perpendicularly outwardly from a non-rotating hub mounted on the tire/wheel assembly. The reflected laser beams from the pair of lasers are continually measured as the vehicle moves along the road surface. The reflected beams determine the change in spacings of the two lasers above the road surface from which can be calculated the angles of camber continuously imparted on the tire/wheel assembly. This data is collected and stored in a computer located in the vehicle and captures the tire's operating camber angles with respect to an actual road surface when used on a particular vehicle. The stored data is later supplied to tire test equipment at a remote test facility to duplicate the actual road camber experienced on the test tire on other test tires at the test facility to simulate the real-world environment for a particular tire on a particular vehicle without repeating the more costly tests on the actual moving vehicle at a remote test track.

17 Claims, 3 Drawing Sheets

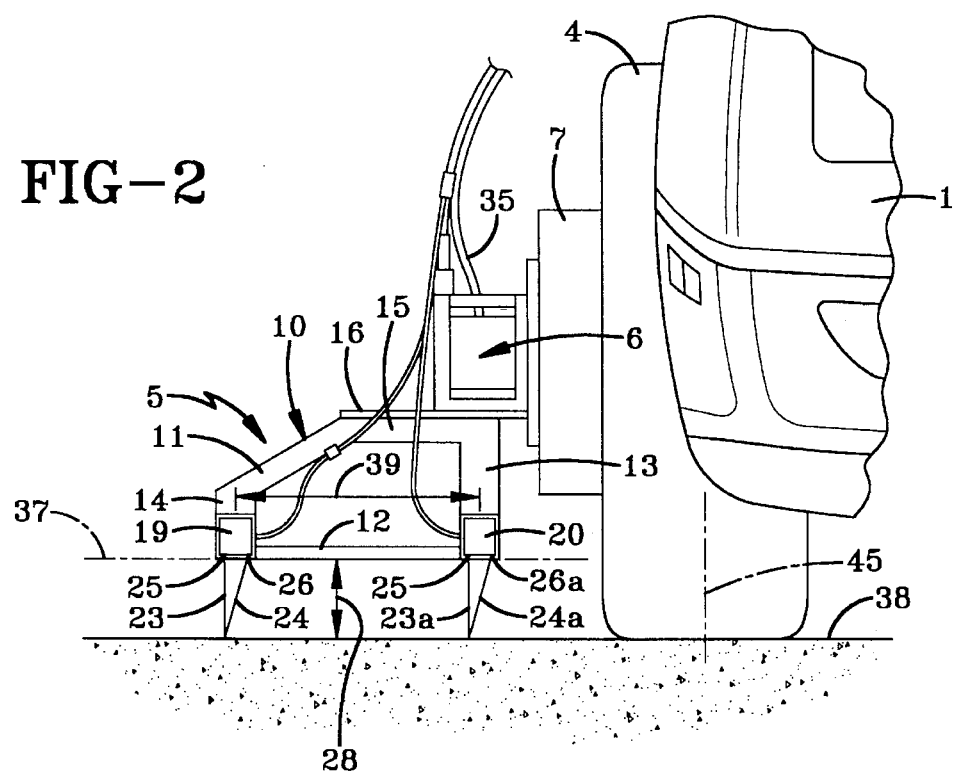
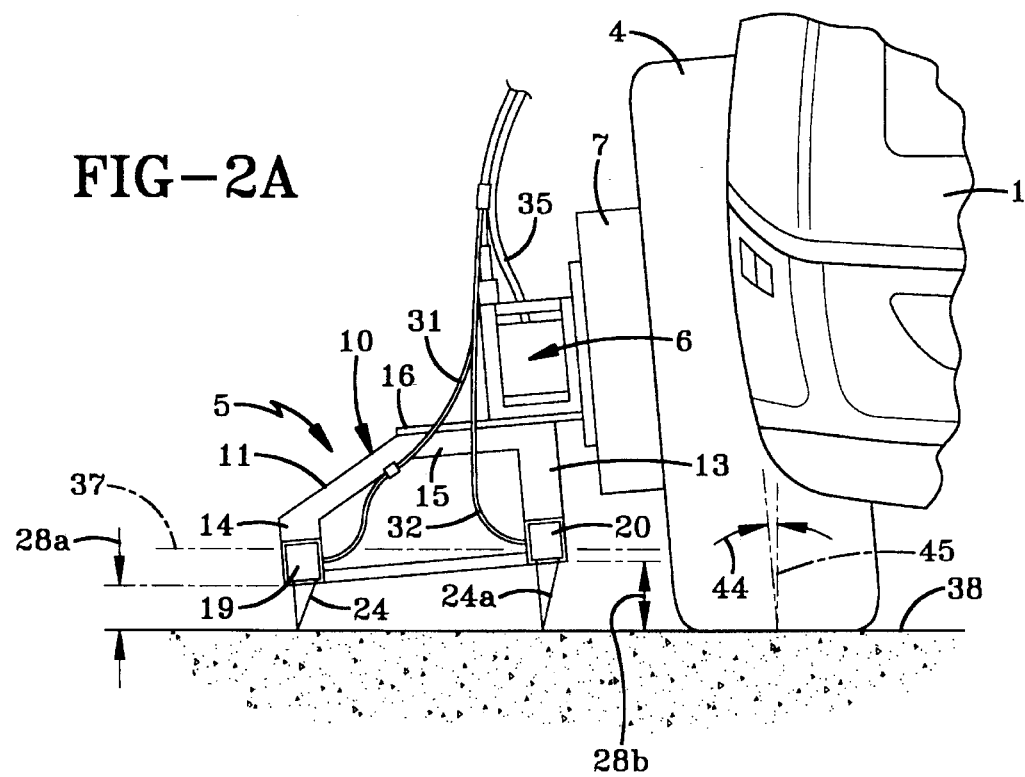

METHOD AND APPARATUS FOR MEASURING THE DYNAMIC CAMBER OF VEHICLE TIRES

BACKGROUND OF THE INVENTION

1. Technical Field

The invention relates to an apparatus and to a method for determining the dynamic camber of vehicle tires. More particularly, the invention relates to such an apparatus and method which measure the dynamic camber on a vehicle tire in an actual operating road environment, wherein changes in road surface and inclination affect the camber. Even more particularly, the invention relates to such an apparatus and method in which the camber angles measured throughout a particular road surface are stored in a computer and reused at a test facility for testing other tires in a controlled environment while impressing on the subsequent test tires actual cambers which the tires would experience under actual road operating conditions and when used with a particular vehicle.

2. Background Information

Various complicated, bulky and expensive equipment has been developed for statically measuring camber on a tire, which is one of the factors tested to determine tire wear and ride characteristics. These prior art systems and equipment are expensive and difficult to operate for performing repeated tests on numerous tires in order to gather sufficient data for determining the effects of camber on a particular tire.

The measurement of camber on a tire and its effect on the wear and ride characteristics thereof, is only one of a number of tests performed on tires to ensure that the tire performs satisfactorily, and in particular, that the tire performs satisfactorily on specific vehicles.

The trend in the tire and automobile industry today is to closely match and design a particular tire as original equipment for a particular vehicle. Thus, automobile manufacturers, in selling the vehicle, will have mounted thereon a particular tire which has been found to provide the most desirable wear and ride characteristics for that particular vehicle and tire.

In order to ensure that the tire provided for a particular vehicle provides the desired results, various tests are performed on prototypes of such tires on the actual vehicle. However, it is difficult for a tire manufacturer to obtain the actual vehicle intended for future production for a sufficient length of time in order to perform all of the tests desired and then repeat the tests on various tires and modifications thereto, in order to arrive at the optimum tire design. The automobile manufacturers usually permit the tire manufacturers to use one of its prototype vehicles for a relatively short period of time and at a facility remote from the tire manufacturer's laboratory to test its prototype tire intended for use on that vehicle when it becomes a future production model.

Heretofore, the effect of camber on a vehicle tire was obtained in a laboratory tire test facility, wherein a road or load wheel is engaged with a test tire and the angle of inclination or camber of the test tire with the road wheel is varied during test cycles. However, such a test does not provide for a real-world environment, nor account for the effect that the structure of a particular vehicle, such as its suspension system, weight and driving characteristics, have on the camber angle which is impressed upon the tire, which then affects the wear characteristics of the tire.

Various prior art devices, some of which use lasers, have been utilized for alignment and for statically measuring both camber and caster in wheel mechanisms, as shown in the following patents.

U.S. Pat. No. 4,898,464 discloses a method and apparatus for determining the position of an object so that the steerable wheels of the vehicle may be aligned. The mechanism includes a microcomputer, a laser, mirror and phototransistor laser ray. The laser light is both emitted and received to provide the information needed to align the steerable wheels of the vehicle.

U.S. Pat. No. 2,077,082 discloses a device that measures both the camber and caster in wheel mechanisms. The measuring device is installed on a shaft of a spindle to allow the camber and caster readings to be taken with the vehicle resting on the floor. The weight distribution for the vehicle will go up upon all the wheels, attempting to simulate actual road conditions.

U.S. Pat. No. 3,963,352 discloses a wheel alignment apparatus wherein a sensor unit is provided which includes a casing, mirror and magnet. The sensor unit is secured to the axle housing of the wheel by use of the magnet. The sensing unit includes a light source and light-sensitive devices. The light is directed to and reflected back from the mirror to provide the measurement necessary to determine the caster and camber of the wheels.

U.S. Pat. No. 4,578,870 discloses a selectable beam/plane-projecting laser and alignment system for a vehicle body and frame. A laser is attached to the vehicle through a carrier bar, and a switching mechanism has a holder member and slide member that is utilized to alternate between a beam of light or plane of light. The plane of light may be projected in any direction orthogonal to the mounting bars.

U.S. Pat. No. 4,454,659 discloses an adjustable carriage assembly utilized in a body alignment device. The adjustable carriage assembly is provided with a measurement bar which is secured to the vehicle, and has a laser sighting instrument attached thereto.

Although certain of these prior art alignment systems use lasers to enable the camber of the vehicle tires to be determined, none of these prior art patents, nor other known prior art devices, provide a device which is attached to a moving vehicle in order to obtain the dynamic angles of camber which the tire experiences as it moves along an actual road surface on a particular moving vehicle.

Therefore, the need exists for an improved apparatus and method for determination of the dynamic camber on a vehicle tire, performed while the tire is moving along an actual road surface and mounted on an actual vehicle of the type on which the tire will be used, which data can then be used at a tire test facility on other test tires in order to test various modifications and changes to a tire in order to arrive at the optimum tire design for a particular vehicle.

SUMMARY OF THE INVENTION

Objectives of the invention include providing a unique apparatus which is of a relatively lightweight and inexpensive construction, and which may be readily mounted on a test vehicle at a vehicle test site for measuring, obtaining and storing data collected of the angles of camber applied to the tire as the tire moves along an actual road surface under actual driving conditions.

A further objective of the invention is to provide such an apparatus and method wherein a pair of lasers or other type transducers are mounted on a bracket which extends perpendicularly outwardly from a non-rotating hub mounted on the actual vehicle tire/wheel assembly; and in which associated equipment instantaneously measures the distance of the lasers from the ground, from which can be calculated the camber angles on the tire as the tire moves along an actual road surface.

Another objective of the invention is to provide such an apparatus and method which converts detected analog signals into digital signals which are stored in a computer or other memory device along with other measured data including time, tire revolutions, forces and moments, which computer will be on-board the vehicle as it moves along the road surface, and which stored information then is applied to tire test equipment at a remote facility, subjecting later developed tires to the same camber angles to which the initial test tire experienced in order to develop the most satisfactory tire for use on the particular vehicle on which the initial tire was tested at a test track.

A still further objective of the invention is to provide such a method and apparatus which measures the angle between the tire/wheel plane and the plane of the road surface directly below the tire in order to provide a meaningful measurement for characterizing the real world environment in which a tire must operate, and which measures the vehicle camber, dynamic camber changes, as well as tilt in the road surfaces, to completely capture a tire's operating camber angles with respect to an actual road surface, thereby measuring the true camber angles that a tire experiences in a working environment.

Another objective of the invention is to provide such an apparatus and method which is considerably simpler and lower cost than prior art camber measurement apparatus and methods, and which is easily and rapidly installed on a test vehicle which then can be driven, even on public roads, in order to quantify the distribution of the camber angles for a particular vehicle/tire/driver/road course system.

These objectives and advantages are obtained by the apparatus of the present invention for measuring the dynamic angles of camber of a tire of a moving vehicle, wherein said apparatus includes a bracket; non-rotating hub means for mounting the bracket on a hub of a tire/wheel assembly of the vehicle, said bracket adapted to extend outwardly from the tire/wheel assembly above a road surface; a pair of transducers mounted in a predetermined spaced relationship on the bracket above the road surface for directing beams of energy against the road surface; detector means for detecting the magnitude of energy reflected off the road surface from the beams of energy, said detector means producing signals, the magnitudes of which represent the distances between the transducers and the road surface at a specific instance of time; signal processing means coupled with the detector means for receiving the signals from the detector means and converting said signals into output data representing the angles of camber of the tire for specific instances of time; and memory means for storing the output data.

These objectives and advantages are further obtained by the method of the present invention for measuring the dynamic camber of vehicle tires, wherein said method includes the steps of providing at least a pair of energy sources for producing beams of energy; providing detector means for each of said energy sources; mounting said energy sources and detector means on a wheel assembly of the vehicle at a predetermined position above the road surface and at a predetermined spaced relationship with respect to each other; directing an energy beam from each energy source against the road surface; detecting and measuring the reflected energy of each energy beam from the road surface by a detector means as the vehicle moves along the road surface; converting the detected and measured reflected energy into signals; processing the signals in a signal processor to determine the distances of the detectors from the road surface; calculating the angle of camber which the tire experiences at any particular instant of time based on the calculated distances; and storing the calculated angle of camber at a particular instant of time in a memory device.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 2 is a fragmentary front elevational view of the apparatus of FIG. 1, shown mounted on the tire/wheel assembly, with negligible camber angle being experienced by the vehicle tire;

FIG. 2A is a view similar to FIG. 2 showing the tire experiencing an angle of camber which is being measured by the apparatus of the present invention mounted thereon;

Similar numerals refer to similar parts throughout the drawings.

DESCRIPTION OF THE PREFERRED EMBODIMENT

Figure 1:
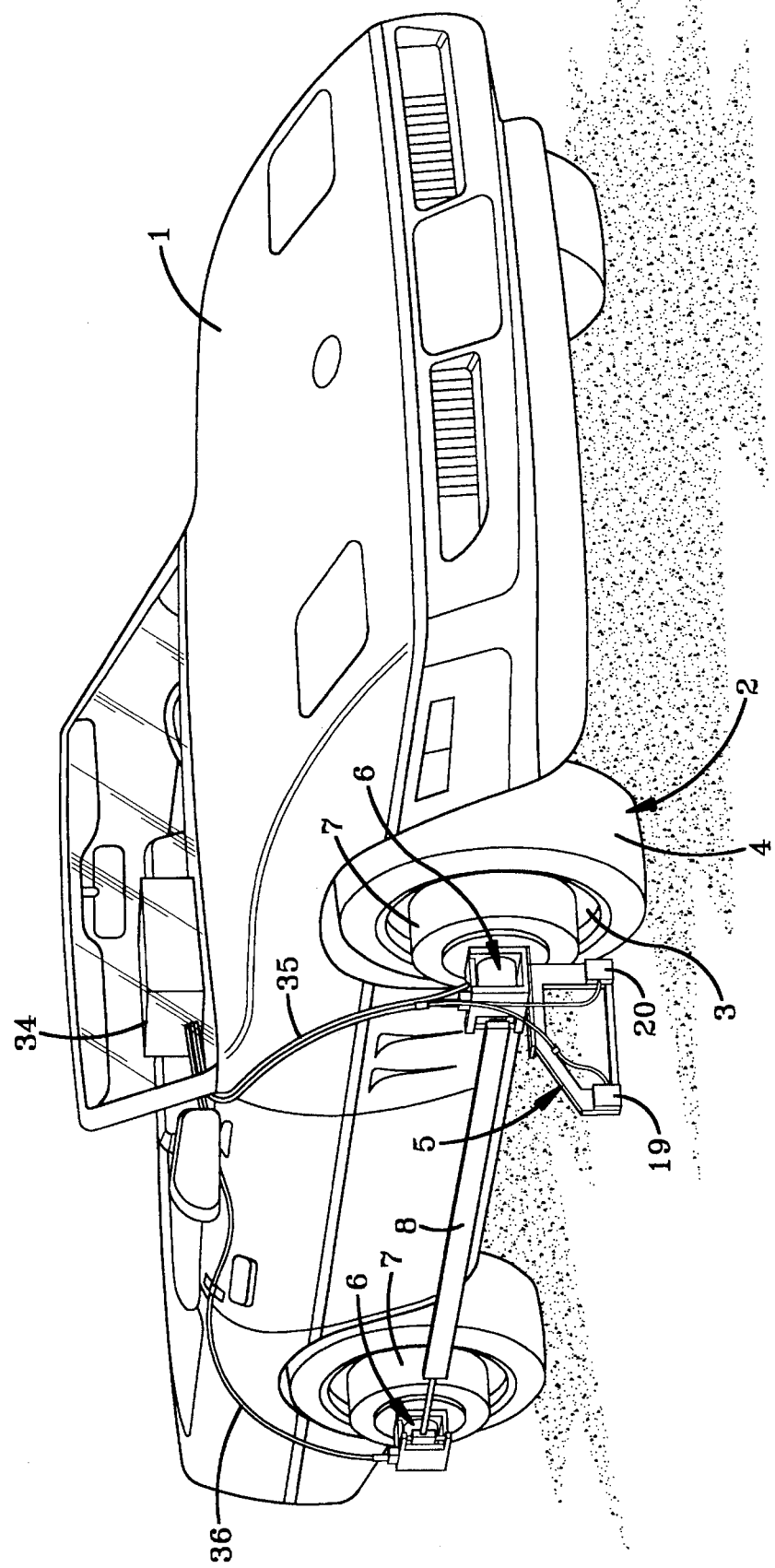
FIG. 1 is a diagrammatic perspective view showing the apparatus of the present invention for determining tire camber, mounted on the front wheel of the tire/wheel assembly of a vehicle.

FIG. 1 is a diagrammatic perspective view showing a usual motor vehicle 1 having a tire/wheel assembly 2 mounted thereon, which consists of a wheel 3 and a tire 4. The apparatus of the present invention for measuring the dynamic angles of camber of tire/wheel assembly 2 is shown mounted thereon, and is indicated generally at 5. Apparatus 5 is mounted on a non-rotating hub assembly, indicated generally at 6, which is mounted on rotating wheel 3 of tire/wheel assembly 2.

Hub assembly 6 is a commercially available device presently being used for performing various load tests on vehicle tires. These devices are referred to as load cell assemblies, and may consist of an adapter hub, transducer and slip ring assembly, which is mounted on wheel 3, and which may contain various internal load cells 7 and associated amplifiers for determining various forces exerted on the tire/wheel assembly. One example of a non-rotating hub assembly 6 which may be used with the apparatus of the present invention is a Model 242 Transducer Interface Assembly manufactured and distributed by GSE, Inc. of Farmington Hills, Mich. However, other types of non-rotating hub assemblies can be utilized for mounting of apparatus 5 on the tire/wheel assembly 2 and for carrying out the method steps of the present invention without affecting the concept thereof.

Apparatus 5 includes a bracket 10 (FIG. 2), having an angular leg 11, a horizontal lower cross member 12, a pair of vertical legs 13 and 14, and an upper horizontal leg 15. Bracket 10 is mounted by a plate 16 to hub assembly 6 and extends in a horizontal cantilever fashion therefrom. The particular construction of bracket 10 can vary from that shown in the drawings and described above without affecting the concept of the invention.

In further accordance with the invention, a pair of transducers 19 and 20 are mounted on bracket 10, preferably at the junction of legs 13 and 14 with lower cross member 12. In the preferred embodiment, transducers 19 and 20 are laser units, each of which includes an emitter 25 for emitting beams of energy, indicated at 23 and 23a, respectively, and a sensor 26 for detecting the reflected beams 24 and 24a, respectively.

The particular type of laser units 19 and 20 may vary, but preferably are relatively high speed in order to obtain the desired results. One type of laser unit found suitable for the present invention is a Model LB-70/LB-11 or LB-72/LB-12 being sold and distributed by Keyence Corporation of America. This particular laser unit preferably is mounted with a standoff distance of 100 mm (indicated at 28 in FIG. 2), and will have a measurement range of ±40 mm. The laser is a semiconductor laser having a wave length of 780 nm, 3 mW, Class IIIb pulse duration: 70 μ. It will have a spot diameter at the 100 mm distance of 1.0×2.0 mm, and a linearity of 1.6% of the measurement range of 80 mm.

However, it is readily understood that other types of laser units can be used without affecting the concept of the invention. Likewise, other types of transducers for producing various beams of energy, such as sonic devices, infrared devices, or the like, could also be utilized, and the invention need not be limited to laser units, as described in the preferred embodiment. However, laser units such as described above have been found to be the most satisfactory to date for accomplishing the desired results.

As shown in FIG. 1, a non-rotating hub assembly 6 may be mounted on both the front and rear tire/wheel assemblies 2 and are connected by a stabilizing beam 8, with the test apparatus 5 of the present invention being shown mounted only on the front tire/wheel assembly. The reflected energy beams 24 and 24a are detected and measured by sensors 26, usually in a DC voltage, which is fed through control cables 31 and 32 to a computer 34 located within the vehicle. Computer 34 also may be connected through other electric cables 35 and 36 to the strain gauges or load cells 7 of hub assemblies 6 mounted on the front and rear tire wheel assemblies for gathering additional tire test data. Readily available software easily converts the DC analog voltage signals supplied by the sensors into digital signals or data which is then stored in the memory of computer 34.

As shown in FIG. 2A, upon the tire/wheel assembly 2, and in particular, tire 4 experiencing an angle of camber, it will result in bracket 11 tilting with respect to its normal horizontal position, which is represented by horizontal line 37, providing two different vertical distances 28a and 28b between laser units 19 and 20, respectively, and the road surface 38. These differences in distance will affect the positions of the reflected energy beams 24 and 24a measured by sensors 26 and 26a, providing different detected DC voltages which are transmitted to the computer through cables 31 and 32 and converted into the stored data, usually in digital form. The computer, by simple mathematical calculations, can determine distance to the road surface and the angle of camber exerted on tire 4 at any instant in time, as indicated at 44 in FIG. 2A. The DC voltage readings represent the distances of the lasers from road surface 38 at any instant of time. The distance to the road surface as a function of distance travelled is saved in the computer memory. Since the horizontal separation, indicated at 39, between the two spaced lasers and, correspondingly, between the two sensors, is known, simple calculations will determine the angle of cross members 12 and 15 which are perpendicular to the vertical plane 45 of tire 4, and, correspondingly, the angle of camber of tire 4. Again, anyone skilled in the art can use standard software, or easily derive the angle of camber, upon knowing the vertical distances between the two laser beams and the road surface, and the horizontal separation therebetween, which in the preferred embodiment is approximately 13 inches.

Figure 4:
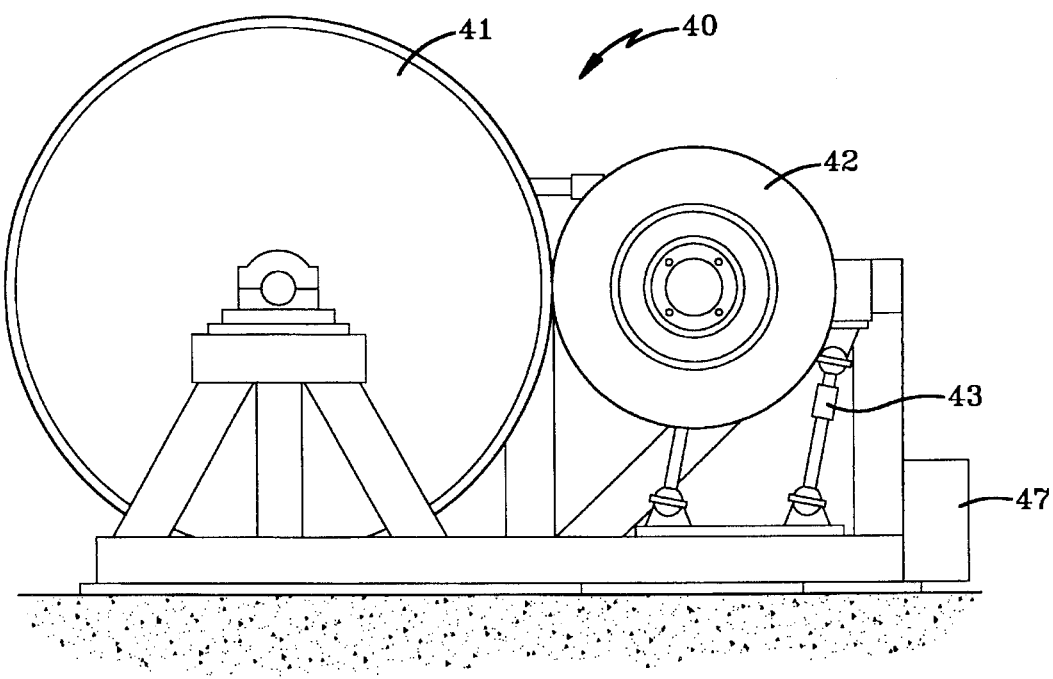
FIG. 4 is a diagrammatic side elevational view of laboratory tire test equipment which uses the determined angles of camber obtained by the apparatus and method of FIGS. 1–3.

In accordance with another feature of the invention, this stored data is then used in usual laboratory tire test equipment, which is indicated at 40 and shown in FIG. 4. Examples of such equipment are shown in U.S. Pat. Nos. 4,856,324 and 3,927,561. Tire test equipment 40 includes a load or road wheel 41 which is rotated at various speeds, and is in engagement with a test tire 42. Tire 42 is mounted on various control devices 43 for moving tire 42 against road wheel 41 with various applied loads and moments, including various camber angles. The stored data of computer 34, which includes instantaneously recorded times, tire revolutions, force and moment measurements as well as camber angle measurements, is fed into the appropriate control panel, computer or other mechanism, indicated at 47, for supplying the commands to the control system for continuously adjusting the angles of camber between test tire 42 and road wheel 41 in the same manner as the previously tested tire 4 experienced as it moved along actual road surface 38. Thus, various test tires 42 can be placed on test equipment 40 and the same dynamic conditions, including dynamic angles of camber, which the actually tested tire 4 experienced, will be experienced on tires 42, exactly as if the test tire 42 had been driven along the same course by the same driver on the same vehicle as was tire 4.

Thus, this stored data of actual dynamic camber angles enables the tire designers to continually redesign certain features of the tire in order to provide a final production tire which provides the best wear and ride characteristics by using actually measured dynamic camber angles, which is a significant improvement over the camber angles determined by the prior art laboratory test methods. This can be determined by tire test equipment 40 in a conveniently located laboratory and in a controlled environment, but provides results as if the tire were tested on the actual vehicle 1, on which the final production tire is intended for use, without the expensive, time-consuming procedure of going to a vehicle test site and mounting the various test tires on the actual vehicle.

Figure 3:
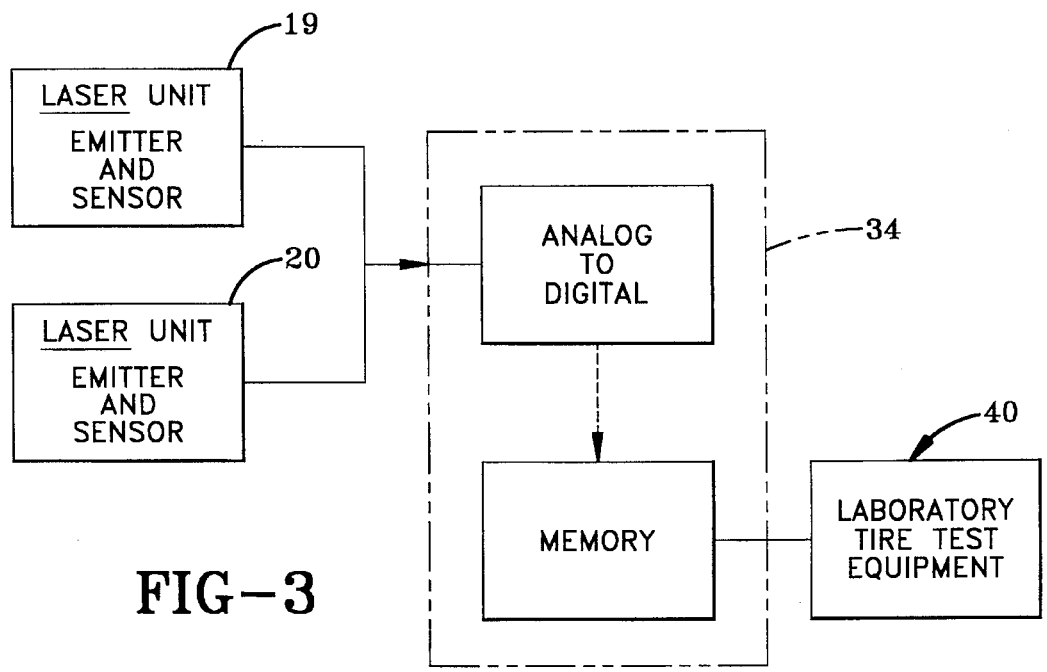
FIG. 3 is a block diagram showing the determination of the angle of camber and it subsequent use.

The method of the present invention is shown in generally block diagram form in FIG. 3, in which the two laser units, each having an emitter and sensor, provide the analog signals to computer 34, which will convert the analog signals to digital signals and store the same in the memory, which is then used with the laboratory tire test equipment 40 repeatedly for performing numerous tests on additional test tires 42. Thus, actual road environment, and, in particular, the camber experienced by a tire being mounted on a particular vehicle as it is driven along a test track, can be continuously applied to test tires in a remote laboratory until the most satisfactory tire is developed for use on a particular future vehicle without the need of additional expensive field testing of the tire on the actual vehicle.

Accordingly, the method and apparatus for measuring the dynamic camber of vehicle tires is simplified, provides an effective, safe, inexpensive, and efficient method and apparatus which achieves all the enumerated objectives, provides for eliminating difficulties encountered with prior methods and apparatus, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the method and apparatus for measuring the dynamic camber of vehicle tires is constructed and used, the characteristics of the construction, and the advantageous, new and useful results obtained; the new and useful structures, devices, elements, arrangements, parts and combinations, and method steps are set forth in the appended claims.

We claim:

1. An apparatus for measuring the dynamic angle of camber of a tire of a moving vehicle, including:
    a) a bracket;
    b) non-rotating hub means for mounting the bracket on a hub of a tire/wheel assembly of the vehicle, said bracket adapted to extend substantially perpendicularly outwardly from the tire/wheel assembly above a road surface;
    c) stabilizing means operatively connected to the bracket for maintaining said bracket in a fixed position free of movement with respect to the tire/wheel assembly;
    d) a pair of transducers mounted in a predetermined spaced relationship on the bracket above the road surface and outwardly of the hub means for transmitting beams of energy against the road surface;
    e) detector means for detecting energy reflected off the road surface from the transmitted beams of energy, said detector means producing signals, the magnitudes of said signals representing the distances between the transducers and the road surface at a specific instance of time;
    f) signal processing means coupled with the detector means for receiving the signals from the detector means and converting said signals into output data representing the angles of camber of the tire for specific instances of time; and
    g) memory means for storing the output data.

2. The apparatus defined in claim 1 in which the transducers are laser units, each having an emitter; and in which the beams of energy are laser beams.

3. The apparatus defined in claim 2 in which the detector means is a laser beam sensor located adjacent the emitter of each of the laser units.

4. The apparatus defined in claim 1 in which the memory means includes a computer.

5. The apparatus defined in claim 1 in which the stabilizing means includes a beam connected to the non-rotating hub means and extending to a second non-rotating hub mounted on another tire/wheel assembly of the vehicle.

6. In combination, a tire/wheel assembly and an apparatus for continuously measuring the dynamic angles of camber of a tire of the tire/wheel assembly of a moving vehicle as it moves along a road surface, including:
    a) a bracket;
    b) means for mounting the bracket on the tire/wheel assembly of the vehicle extending substantially perpendicularly outwardly from the tire/wheel assembly above the road surface and free of movement with respect to the tire/wheel assembly;
    c) transducer means mounted on the bracket above the road surface for transmitting at least two beams of energy against the road surface;
    d) means for detecting the energy of the transmitted beams reflected off the road surface and producing signals, the magnitudes of said signals representing two distances between two known references on the bracket and the road surface at specific instances of time; and
    e) signal processing means coupled with the detecting means for converting said signals into output data representing the angles of camber of the tire for specific instances of time.

7. The combination defined in claim 6 in which the means for mounting the bracket on the tire/wheel assembly is a non-rotating hub and a beam extending from said hub to a second non-rotating hub mounted on a second tire/wheel assembly of the vehicle.

8. The combination defined in claim 6 in which the transducer means is a pair of laser units mounted in a predetermined horizontal spaced relationship on the bracket spaced substantially perpendicularly outwardly with respect to a vertical plane of the tire/wheel assembly.

9. The combination defined in claim 8 in which the means for detecting the reflected beams is a sensor associated with each of the laser units.

10. The combination defined in claim 6, including memory means for storing the output data.

11. The combination defined in claim 10 in which the memory means includes a computer.

12. A method of measuring a camber of a vehicle tire mounted on a wheel assembly of a particular vehicle as the vehicle moves along a road surface, including the steps of:
    a) providing at least a pair of energy sources for producing beams of energy;
    b) providing detector means for each of said energy sources;
    c) mounting said energy sources and detector means at a predetermined fixed position on a rigidly fixed non-rotatable bracket extending substantially perpendicularly outwardly from a vertical plane of the wheel assembly above the road surface, with said energy sources and detector means being at a predetermined spaced relationship with respect to each other on the bracket;
    d) transmitting at least two energy beams against the road surface;
    e) detecting and measuring the reflected energy of each transmitted energy beam from the road surface by each detector means as the vehicle moves along the road surface, and converting the reflected energy into signals which represent a distance to the road surface for each energy beam;
    f) calculating the angles of camber which the tire experiences for particular instances of time from the signals which represent the distance to the road surface for each energy beam; and
    g) storing the calculated angles of camber in a memory device.

13. The method defined in claim 12, including the step of applying the stored angles of camber from the memory device to tire test equipment at a facility remote from the road surface to simulate the camber angles on another test tire mounted on the tire test equipment.

14. The method defined in claim 12, including the step of storing the determined angles of camber for progressive instances of time as the vehicle tire/wheel assembly moves along the road surface.

15. The method defined in claim 12 in which the energy sources are laser units.

16. The method defined in claim 12 in which the detected reflected energies provide analog signals; and in which the analog signals are converted into digital signals; and in which the digital signals are stored in the memory device.

17. The method defined in claim 16 in which the memory device is a computer.

\* \* \* \* \*